Patented Jan. 17, 1950

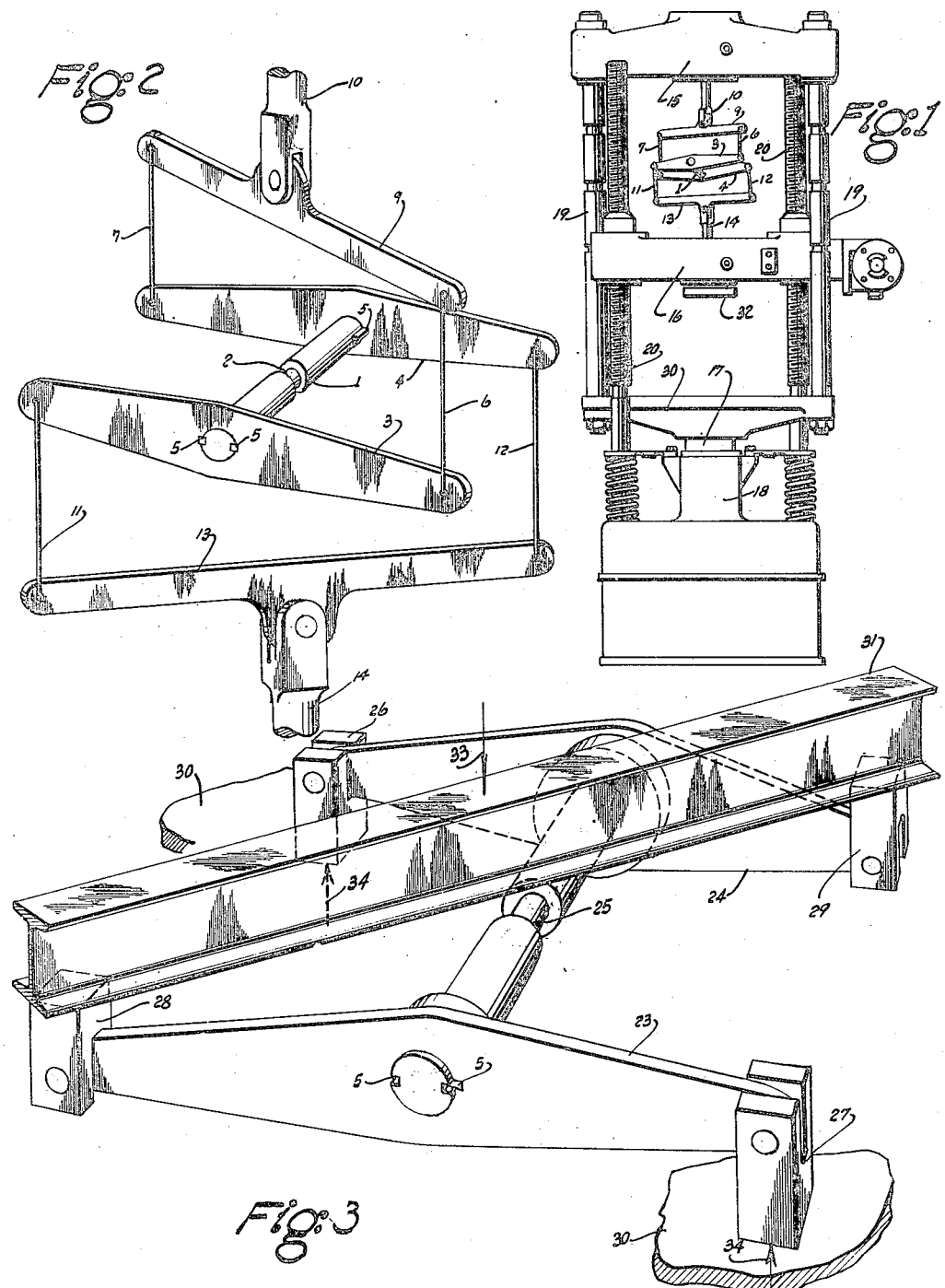

2,494,671

UNITED STATES PATENT OFFICE 2,494,671

TORSION PRODUCING APPARATUS

Herman Schaevitz, Collingswood, N. J., assignor to The Baldwin Locomotive Works, a corporation of Pennsylvania Application September 4, 1945, Serial No. 614,237

3 Claims. (Cl. 73—99)

This invention relates generally to apparatus for producing torsion in a member and is particularly useful in the fields of materials testing as well as torsional calibration of dynamometer bars or the like.

In subjecting a member to torsion there has heretofore been the difficulty of eliminating bending effects in the member. For instance, in torsion testing machines any misalignment of the gripping jaws or holders at each end of the specimen would induce bending stresses in the test specimen in addition to the torsion stresses thereby creating inaccuracies. The same conditions have heretofore prevailed in calibrating torsion dynamometer bars unless an extreme degree of care and precision control is employed. This is not only expensive but is time consuming as well.

It is an object of my invention to provide an improved torsion producing mechanism that is adapted to induce pure torsion in a member free of bending effects or undesired stresses.

A further object is to provide an improved torsion producing mechanism adapted to permit torsion to be produced by applying simple tension or compression forces to the mechanism whereby the mechanism may be readily employed in a tension or compression type materials testing machines.

A still further object is to provide an improved torsion producing mechanism that is relatively simple and economical in construction, operation and maintenance and which affords maximum ease in mounting the mechanism in a testing machine or other load producing apparatus.

Other objects and advantages will be more apparent to those skilled in the art from the following description of the accompanying drawing in which:

Fig. 1 is a side elevation of a materials testing machine in which my improved torsion mechanism is mounted;

Fig. 2 is an enlarged perspective of the torsion mechanism adapted for tension loading; and Fig. 3 is a perspective of a modified form of torsion mechanism arranged for compression loading.

As shown in Fig. 2 a member 1 to be tested or calibrated in torsion, and which may have a reduced section 2 at which the calibration or test failure may occur, is mounted at its opposite ends in parallel torsion producing radial arms 3 and 4 suitably keyed thereto as at 5. These keys are preferably placed at diametrically opposite points to insure uniform transmission of torsional forces from the arms to the member. One pair of the diagonally disposed ends of these arms are connected by links 6 and 7 to a diagonally disposed equalizing element 9 which is pivotally connected to an upper pull rod 10. The other pair of diagonally disposed ends of the arms are connected at 11 and 12 to a lower equalizing element 13 which is pivotally connected to the lower pull rod 14. The rods 10 and 14 constitute means for connecting the foregoing linkages to the usual upper and lower gripping jaws in crossheads 15 and 16 of any suitable materials testing machine. The machine specifically illustrated is of the Emery type, Patent 1,848,468, although any type of loading mechanism may be used. Hence, it will suffice to state that a load producing ram 17 is moved upwardly in a loading cylinder 18 by fluid pressure supplied thereto. This upward movement transmits load through side rods 19 to the crosshead 15 while the crosshead 16 is connected by screw threaded rods 20 to a usual load weighing system such as a hydraulic capsule in the lower part of the machine.

In the operation of the Fig. 2 form, a tension load applied to rods 19 and 14 in directions away from each other will cause links 6 and 7 to pull upwardly and links 11 and 12 to pull downwardly thereby tending to rotate arms 3 and 4 in opposite directions to produce equal and opposite torsional action and reaction forces at the ends of member 1. Inasmuch as the test member 1 can move freely with all vertical movements of both arms, it is seen that the test member is adapted to float in a self-adjusting manner to any deflection of its axis when under load and therefore it is impossible to subject member 1 to any bending effects with the result that pure torsion is induced in the member. It may be said that the member is supported at only two points, 6 and 7, which lie in a transverse plane placed at an angle to the axis. My improved arrangement not only accomplishes this highly desirable result, but does so in an extremely simple and effective manner as well as economically, combined with ease of insertion in a loading machine.

To utilize my apparatus under compression load, I have provided as shown in Fig. 3 a pair of torsion producing radial arms 23 and 24 in which a member 25, corresponding to 1, is mounted and keyed in the same manner as shown in Fig. 2, that is suitable recesses are formed in the arms to preferably snugly receive the ends of the test member. Two of the diagonally disposed ends of the arms are provided with downwardly extending pivoted blocks 26 and 27 while the other diagonal ends have upwardly extending pivoted blocks 26 and 29. The blocks 26 and 27 are then supported on a usual table or loading platen 30 of a testing machine while an I-beam or other suitable load transmitting member 31 is supported upon the upwardly extending blocks 28 and 29 whereby the crosshead 16 with its usual compression head 32 may be brought to bear at the center of the I-beam as indicated by the loading arrow 33, Fig. 3. The loading forces and reaction forces are indicated by arrows 33 and 34. It will be understood that the lower ends of pivot blocks 28 and 29 are spaced above the loading table 30 to provide sufficient clearance for full torsional loading of the member 25 when the compression load is applied to the beam 31. Also the upper ends of the blocks 26 and 27 are free of crosshead 16. In the operation of this arrangement, it is seen that the downward force 33 causes downward movement of one pair of the diagonal ends of the arms while the upward forces 34 on the other pair of diagonal ends cause relative upward movement thereof. This results in a pure torsion being induced in member 25 free of any bending effects. The beam 31 and table 30 correspond to the equalizing arms 13 and 9 while blocks 26—29 correspond to links 6, 7, 11 and 12. Thus the two point supporting relation and the floating and self-adjusting characteristics are common to each form.

Thus it is seen that my improved arrangement of Fig. 3 can be employed with a loading mechanism such as a testing machine adapted for only compression loading whereas the Fig. 2 arrangement can be employed with a loading mechanism adapted only for tension loading.

It will of course be understood that various changes in details of construction and arrangement of parts may be made by those skilled in the art without departing from the spirit of the invention as set forth in the appended claims.

I claim:

1. Apparatus for subjecting a member to torsion comprising, in combination, a plurality of means each having portions extending radially from said member on opposite sides thereof and connected to said member at points spaced along the length thereof, rectilinearly movable means for applying equalized forces to oppositely extending portions of said radial means at only two points located diagonally across the torsional axis of said member and radially spaced therefrom, and means for equalizing and applying reaction forces to the other oppositely extending portions of said radial means at only two points which lie in a diagonal direction across said other diagonal, whereby said forces subject the member to torsion while allowing it to adjust its bodily position to prevent bending thereof.

2. The combination set forth in claim 1 further characterized in that the rectilinearly movable means comprises means whereby the equalized forces are in tension.

3. The combination set forth in claim 1 further characterized in that the rectilinearly movable means comprises means whereby the equalized forces are in compression.

HERMAN SCHAEVITZ.

REFERENCES CITED

The following references are of record in the file of this patent:

UNITED STATES PATENTS

| Number | Name | Date |
|---|---|---|
| 155,051 | Thurston | Sept. 15, 1874 |
| 1,831,320 | Pertz | Nov. 10, 1931 |
| 2,067,140 | Dinzl | Jan. 5, 1937 |

FOREIGN PATENTS

| Number | Country | Date |
|---|---|---|
| 510,954 | Germany | Oct. 24, 1930 |
| 534,157 | Germany | Sept. 23, 1931 |